J. A. OLBON.
AUTOMOBILE STEERING POST LOCK.
APPLICATION FILED JAN. 28, 1920.
1,366,021.
Patented Jan. 18, 1921.
2 SHEETS—SHEET 1.
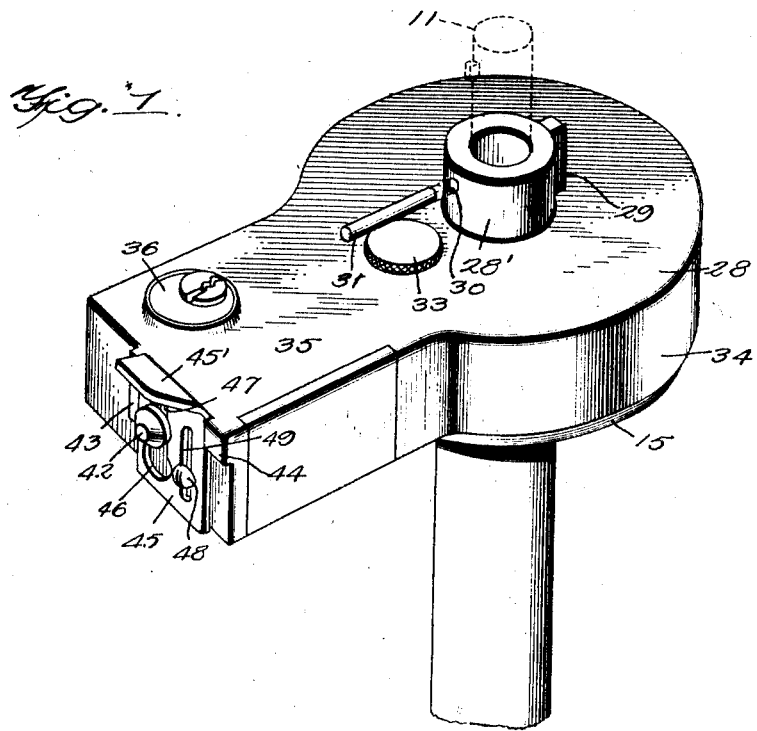
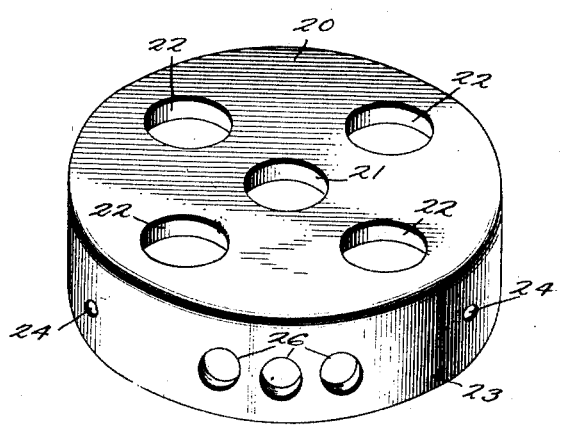
Inventor
John A. Olbon,
By
Attorney J. A. OLBON.
AUTOMOBILE STEERING POST LOCK.
APPLICATION FILED JAN. 28, 1920.
1,366,021.
Patented Jan. 18, 1921.
2 SHEETS—SHEET 2.
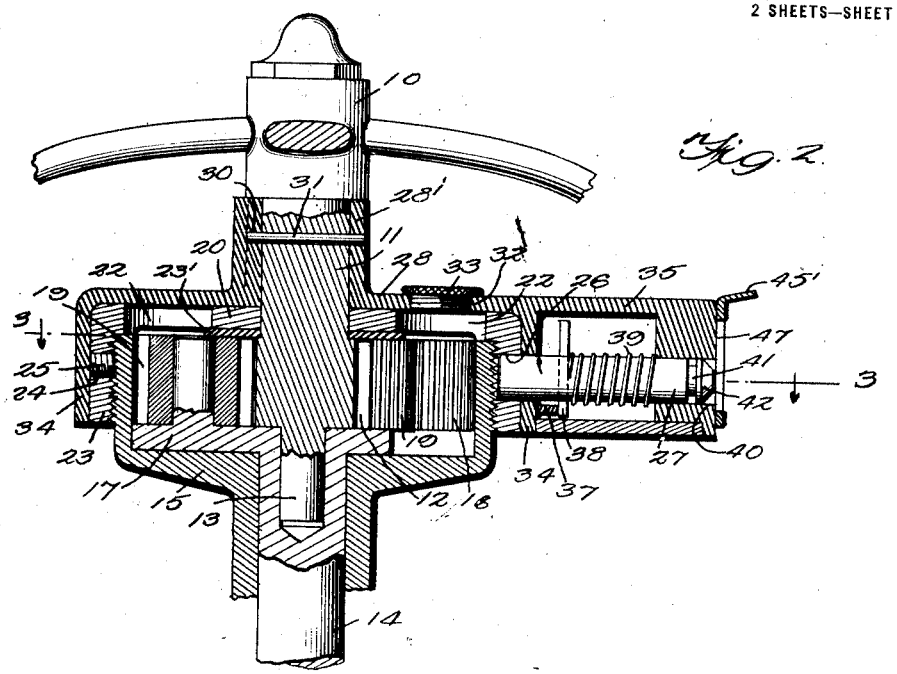
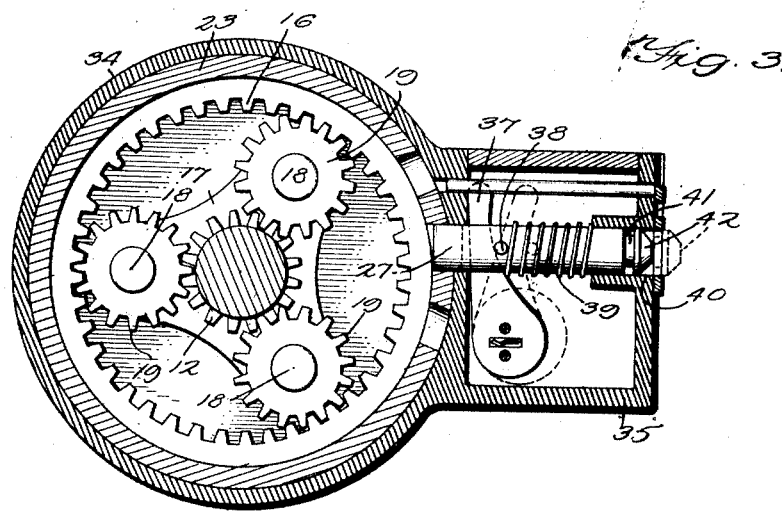
Inventor
John A. Olbon,

UNITED STATES PATENT OFFICE.

JOHN A. OLBON, OF PATERSON, NEW JERSEY, ASSIGNOR TO AUTO SAFETY DEVICE COMPANY, OF UNION, NEW JERSEY, A CORPORATION OF NEW JERSEY.

AUTOMOBILE-STEERING-POST LOCK.

1,366,021.   Specification of Letters Patent.   Patented Jan. 18, 1921.

Application filed January 28, 1920. Serial No. 354,550.

*To all whom it may concern:*

Be it known that I, JOHN A. OLBON, a citizen of the United States, residing at Paterson, in the county of Passaic and State of New Jersey, have invented certain new and useful Improvements in Automobile-Steering-Post Locks, of which the following is a specification.

This invention relates to improvements in automobile steering post locks.

An important object of the invention is to provide a lock for steering posts which embodies a train of planetary gearing similar to that now in use on the Ford automobile.

A further object is to provide a lock of the above character which is unremovable after application to the steering post. I am aware that a number of locks of this type have been devised, but the majority of these locks may be removed from the steering post by removing the steering wheel and are open to the further objection that they provide no means whereby the planetary gear train forming a portion of the steering mechanism may be supplied with the oil or grease necessary to its proper operation.

Other objects and advantages will be apparent throughout the course of the following description.

In the accompanying drawings, wherein for the purpose of illustration is shown a preferred embodiment of my invention and wherein like numerals designate like parts throughout, Figure 1 is a perspective view of my lock attached to a steering post.

Fig. 2 is a vertical section taken through my lock.

Fig. 3 is a section taken on the line 3—3 of Fig. 2, and

Fig. 4 is a perspective view of the cover plate detached.

Referring now more particularly to the drawings the numeral 10 indicates a steering wheel which is secured to the upper end of a stub shaft 11.

This stub shaft is provided adjacent its lower end with a gear 12 which forms the sun gear of a planetary train. The lower end of the stub shaft 11 is reduced as at 13 and seated in a bore formed in the upper end of the steering post proper 14. The steering post is provided with the usual stationary casing 15 which is provided upon its upper end with a flange having formed upon its inner face gear teeth 16. The upper end of the steering post 14 is provided with the usual triangular plate 17 having stub shafts 18 extending upwardly therefrom. These stub shafts have mounted thereon pinions 19 which mesh with sun gear 12 and with the stationary gear teeth 16 formed upon the flange of the steering post casing.

A plate 20 is provided having a central aperture 21 adapted to rotatably receive the stub shaft 11. This plate is also provided with a series of openings 22 for the purpose of lightening the plate and a further purpose hereinafter to appear. A depending flange 23 is formed upon the plate 20 having threaded openings 24 formed therein for the reception of set screws 25. The interior face of the flange 23 is screw threaded to coact with the outer face of the flange of the steering post casing. A washer 23' is provided upon the stub shaft 11 intermediate the gear 12 and the plate 20 which prevents accidental vertical displacement of the pinions 19, such displacement being possible by reason of the series of openings 22 formed in the plate. When the plate 20 is placed in position set screws 25 are supplied in the openings 24 and engage in the threads of the flange of the steering post casing. The flange 23 is also provided with a plurality of openings 26 adapted to receive the bolt 27 of the lock.

A casing plate 28 is provided having central upstanding flanges 28' having an aperture through which the stub shaft 11 extends. The flange 28' is provided upon one side thereof with a solid extension 29 and a bore 30 is formed through the opposite wall of the flange and extends partially through the extension 29. An alined bore is formed in the stub shaft 11 and a pin 31 is inserted. It will be seen that when the pin 31 is driven in flush with the face of the flange that it is unremovable except by boring or by filing the extension 29 until the end of the pin is exposed when it may be driven out.

Formed in the upper surface of the plate 28 is a threaded aperture 32 which may be alined with the aperture 22 formed in the plate 20. This aperture receives an externally threaded cap 33 which is removable. It will be seen that by removing the cap 33 and alining the aperture 32 with one of the apertures in the plate 20 grease may be inserted to the planetary gear train.

The plate 28 is provided with depending flange 34 closely fitting and slidable upon the outer face of the flange 23 of the plate 20. It will be seen that when the set screws 25 have been placed in position and the plate 20 thus locked upon the steering post casing that if the plate 28 is placed in position and the pin 31 inserted each of these plates become irremovable.

The plate 28 is provided at one side thereof with an extension 35 in which is mounted the usual rotatable key operated member 36 provided with a finger 37 which engages a pin 38 extending through the bolt 27. The bolt 27 is normally projected for engagement in the apertures 26 of the plate 20 by means of a spring 39.

The rear face of the extension 35 is provided with an opening 40 through which the rear end of the bolt 27 extends. The bolt is provided adjacent its rear end with a groove 41 forming a head 42. Slidably mounted upon the rear face of the extension 35 intermediate the guides 43 and 44 formed thereon is a plate 45. This plate is provided adjacent its lower end with an aperture 46 of slightly larger size than the head 42 of the bolt. This aperture 46 communicates with the groove 47 which is of smaller size than the head of the bolt and of sufficient size to receive the bolt at the reduced portion thereof formed by the groove 41. The plate 45 is provided with a thumb piece 45', by means of which it may be operated and may be further guided, if so desired, by means of a screw 48 mounted in the rear face of the extension 35 and operating in a guiding slot 49 formed in the plate.

In installing my lock the cover plate usually employed for the planetary gear casing of the Ford is removed as is the stub shaft 11 bearing the sun gear. The stub shaft 11 is replaced by one provided with an opening adapted to receive the pin 31. The washer 23' is then placed in position and the cover plate 20 screwed on in place of the removed cover plate. The set screws 25 are then locked in position and the plate 28 placed over the plate 20 and the pin 31 inserted.

It will thus be obvious that I have provided a lock which is readily attachable, but which may not be removed without partially destroying the same and that at the same time I have provided means whereby lubrication may be supplied to the planetary gear train without removing the lock.

What I claim is:

1. The combination with a steering gear embodying an internal gear fixed against rotation and having an open top, a central rotatable gear and a pinion meshing with said internal gear arranged within said internal gear, of a cover plate for said internal gear having bolt receiving apertures, means to prevent rotation of said cover plate, a casing plate covering the apertures in said cover plate, said casing plate being secured to said rotatable gear to rotate therewith, and a key operated bolt carried by said casing plate and adapted to coact with the bolt receiving apertures in said cover plate.

2. The combination with a steering gear embodying an internal gear fixed against rotation, a central rotatable gear and a pinion meshing with said internal gear, of a cover plate for said pinion and gears, a flange formed on said cover plate engaging the exterior of said internal gear, means preventing rotation of said cover plate with relation to said internal gear, said flange having an opening formed therein, a casing plate covering arranged upon said cover plate, said casing plate being secured to said rotatable gear to rotate therewith, and a key operated bolt carried by said casing plate and adapted to coact with the opening in the flange of said cover plate.

3. The combination with a steering gear embodying an internal gear fixed against rotation, a central rotatable gear and a pinion meshing with said internal gear, of a cover plate for said pinion and gears, a flange formed on said cover plate engaging the exterior of said internal gear, securing means extending through the flange of said cover plate and engaging said internal gear to prevent rotation of said cover plate, the flange of said cover plate having an opening formed therein, a casing plate arranged upon said cover plate, said casing plate being secured to said rotatable gear to rotate therewith, and a key operated bolt carried by said casing plate and adapted to coact with the opening in the flange of said cover plate, and a depending flange formed on said casing plate and slidably engaging the outer face of the flange of said cover plate.

In testimony whereof I affix my signature in presence of two witnesses.

JOHN A. OLBON.

Witnesses:
 RUDOLPH H. MATTHIES,
 JAMES R. RUDY.